United States Patent
Sato et al.

(10) Patent No.: US 9,299,334 B2
(45) Date of Patent: Mar. 29, 2016

(54) SOUND SOURCE DETECTING SYSTEM AND SOUND SOURCE DETECTING METHOD

(71) Applicants: Jun Sato, Susono (JP); Ryuji Funayama, Yokohama (JP); Tomoya Takatani, Nissin (JP); Osami Yamamoto, Nagoya (JP); Kensaku Asahi, Nagoya (JP); Hideki Banno, Tokai (JP); Keiichi Yamada, Nissin (JP); Akira Ogawa, Tokyo (JP); Yuichi Tanaka, Seto (JP); Hiroyuki Hoshino, Nagoya (JP)

(72) Inventors: Jun Sato, Susono (JP); Ryuji Funayama, Yokohama (JP); Tomoya Takatani, Nissin (JP); Osami Yamamoto, Nagoya (JP); Kensaku Asahi, Nagoya (JP); Hideki Banno, Tokai (JP); Keiichi Yamada, Nissin (JP); Akira Ogawa, Tokyo (JP); Yuichi Tanaka, Seto (JP); Hiroyuki Hoshino, Nagoya (JP)

(73) Assignees: TOYOTA JIDOSHA KABUSHIKI KAISHA, Aichi-ken (JP); MEIJO UNIVERSITY, Nagoya (JP)

(*) Notice: Subject to any disclaimer, the term of this patent is extended or adjusted under 35 U.S.C. 154(b) by 76 days.

(21) Appl. No.: 14/346,060
(22) PCT Filed: Sep. 19, 2012
(86) PCT No.: PCT/IB2012/001826
§ 371 (c)(1),
(2) Date: Mar. 20, 2014
(87) PCT Pub. No.: WO2013/041942
PCT Pub. Date: Mar. 28, 2013

(65) Prior Publication Data
US 2014/0241532 A1 Aug. 28, 2014

(30) Foreign Application Priority Data
Sep. 20, 2011 (JP) .................................. 2011-205322

(51) Int. Cl.
G01S 1/14 (2006.01)
G10K 11/00 (2006.01)
(52) U.S. Cl. (Continued)
CPC .............. *G10K 11/002* (2013.01); *G01S 3/8083* (2013.01); *G01S 3/86* (2013.01); *H04R 29/00* (2013.01)

(58) Field of Classification Search
CPC ............................... G10K 11/002; H04R 29/00
USPC ........ 73/146.5; 340/943; 381/56, 71.11, 71.4, 381/91, 92; 701/111, 93; 303/146, 191
See application file for complete search history.

(56) References Cited

U.S. PATENT DOCUMENTS 5,758,311 A * 5/1998 Tsuji et al. ..................... 701/111
5,839,800 A * 11/1998 Koga ....................... B60K 6/46
188/156

(Continued)

FOREIGN PATENT DOCUMENTS

CN 101431706 A 5/2009
CN 101512374 A 8/2009

(Continued)

*Primary Examiner* — Gerald Gauthier
(74) *Attorney, Agent, or Firm* — Sughrue Mion, PLLC

(57) ABSTRACT

A sound source detecting system that detects a predetermined sound source on the basis of sounds collected by sound collectors includes: a noise extracting unit that extracts a noise from signals of the collected sounds; and a noise suppressing unit that suppresses a signal component of the noise extracted by the noise extracting unit from the signals of the collected sounds. The sound source detecting unit detects a location of the predetermined sound source, such as an approaching vehicle, using information about the sounds having the signals of which the noise is suppressed.

11 Claims, 9 Drawing Sheets

(51) Int. Cl.
 *G01S 3/808* (2006.01)
 *G01S 3/86* (2006.01)
 *H04R 29/00* (2006.01)

(56) References Cited

U.S. PATENT DOCUMENTS

| | | | | |
|---|---|---|---|---|
| 6,484,086 | B2* | 11/2002 | Jeon | G06T 7/004 |
| | | | | 701/93 |
| 6,504,490 | B2* | 1/2003 | Mizushima | 340/943 |
| 7,020,288 | B1* | 3/2006 | Ohashi | 381/71.4 |
| 7,054,452 | B2* | 5/2006 | Ukita | 381/92 |
| 7,673,504 | B2* | 3/2010 | Matsuda et al. | 73/146.5 |
| 8,016,365 | B2* | 9/2011 | Yuda | B60T 8/1755 |
| | | | | 303/146 |
| 8,104,845 | B2* | 1/2012 | Itoh et al. | 303/191 |
| 8,184,827 | B2* | 5/2012 | Yoshizawa et al. | 381/91 |
| 8,737,634 | B2* | 5/2014 | Brown et al. | 381/71.11 |
| 2002/0048376 | A1 | 4/2002 | Ukita | |
| 2009/0285409 | A1 | 11/2009 | Yoshizawa et al. | |
| 2014/0241532 | A1* | 8/2014 | Sato et al. | 381/56 |
| 2015/0331095 | A1* | 11/2015 | Sato | G01S 11/14 |
| | | | | 381/56 |
| 2015/0332917 | A1* | 11/2015 | Sato | C23C 16/0272 |
| | | | | 438/685 |

FOREIGN PATENT DOCUMENTS

| | | |
|---|---|---|
| EP | 2 312 579 A1 | 4/2011 |
| JP | 05-092767 U | 12/1993 |
| JP | 6-161473 A | 6/1994 |
| JP | 2002351488 A | 12/2002 |
| JP | 2007-208828 A | 8/2007 |
| JP | 2009231928 A | 10/2009 |
| WO | 97/48252 A1 | 12/1997 |
| WO | 2008/062854 A1 | 5/2008 |
| WO | 2008056649 A1 | 5/2008 |

* cited by examiner

SOUND SOURCE DETECTING SYSTEM AND SOUND SOURCE DETECTING METHOD

BACKGROUND OF THE INVENTION

1. Field of the Invention

The invention relates to a sound source detecting system and sound source detecting method that detect a sound source on the basis of sounds collected by a plurality of sound collectors.

2. Description of Related Art

In a sound source detecting system, an ambient sound is collected by a plurality of sound collectors, and the location of a sound source (particularly, the travelling sound of a vehicle) is identified on the basis of an arrival time interval between the collected sounds. In the system described in Japanese Utility Model Application Publication No. 5-92767 (JP 5-92767 U), electrical signals output from a plurality of microphones arranged at a predetermined interval are converted into corrected electrical signals by removing frequency components in a low-frequency band and a high-frequency band with the use of a band pass filter from the electrical signals, power in a predetermined frequency band in which the feature of the travelling sound of a vehicle appears is calculated from the corrected electrical signals, it is determined that there is an approaching vehicle when the power level is higher than a predetermined value, and corrected electrical signals are converted into noise reduction signals by removing unnecessary noise components from the corrected electrical signals, a crosscorrelation between the noise reduction signals of the plurality of microphones is computed, and the approaching direction of the approaching vehicle is computed from an arrival time interval at which the correlation is maximum.

Incidentally, in the above described technique, it is possible to detect the direction of the approaching vehicle; however, other unnecessary noises, such as a sound emitted from a host vehicle (an engine, a cooling fan, and the like) and a construction site, are also detected. These noises impair detection of a required sound source, such as an approaching vehicle, so there are many erroneous detections and it is difficult to improve detection accuracy.

SUMMARY OF THE INVENTION

The invention provides a sound source detecting system and a sound source detecting method that are able to improve detection accuracy by reducing erroneous detections.

A first aspect of the invention provides a sound source detecting system. The sound source detecting system detects a predetermined sound source on the basis of information about sounds collected by a plurality of sound collectors. The sound source detecting system includes: a noise extracting unit that extracts a noise, emitted from a sound source other than the predetermined sound source, from signals of the sounds collected by the plurality of sound collectors; a noise suppressing unit that suppresses a signal component of the noise extracted by the noise extracting unit from the signals of the sounds collected by the plurality of sound collectors; and a sound source detecting unit that detects a location of the predetermined sound source using information about the sounds having the signals of which the signal component of the noise is suppressed by the noise suppressing unit.

In the sound source detecting system, a noise is extracted from the signals of the sounds collected by the sound collectors, a signal component of the extracted noise is suppressed, and a location of the predetermined sound source is detected using information about sounds having the signals of which the signal component of the noise is suppressed. Thus, it is possible to accurately detect only a required sound source without receiving the influence of a noise, so it is possible to reduce erroneous detections and improve the detection accuracy of the sound source.

In addition, the sound source detecting system may be mounted on a mobile unit, and the noise extracting unit may execute a noise emphasizing process over a noise from a noise source inside the mobile unit. In this case, when the direction of a noise with respect to the sound collectors or distances from the noise to the sound collectors are known, it is possible to further accurately extract a signal component of the noise to be suppressed, so it is possible to execute a sound source detecting process in a suitable condition.

In the sound source detecting system, extracting a noise by the noise extracting unit and suppressing a signal component of the noise by the noise suppressing unit may be alternately performed. In this case, a noise extracting process and a noise suppressing process are alternately executed, so it is possible to reduce a processing load on an ECU, or the like.

In the sound source detecting system, extracting a noise by the noise extracting unit and suppressing a signal component of the noise by the noise suppressing unit may be performed in parallel with each other. In this case, a noise extracting process and a noise suppressing process are executed in parallel with each other, so it is possible to reduce a processing time. Then, the noise suppressing process is executed immediately after noise extraction, so it is possible to improve the performance of noise suppression.

In the sound source detecting system, the sound source detecting system may be mounted on a vehicle, the vehicle may include a vehicle state detecting unit that detects a vehicle state of the vehicle, and extracting a noise by the noise extracting unit and suppressing a signal component of the noise by the noise suppressing unit may be performed on the basis of the vehicle state detected by the vehicle state detecting unit. In this case, because the noise extracting process and the noise suppressing process are executed on the basis of the vehicle state, it is possible to cancel these processes when not required and to execute these processes only when required. Therefore, it is possible to reduce a processing load on an ECU, or the like, and it is possible to execute the sound source detecting process in a further suitable condition.

In the sound source detecting system, the sound source detecting system may be mounted on a vehicle, the vehicle may include a surrounding environment detecting unit that detects a surrounding environment around the vehicle, and, when there is a noise source in the surrounding environment detected by the surrounding environment detecting unit, the noise extracting unit may extract a noise emitted from the noise source. In this case, it is also possible to suppress a signal component of a noise from a noise source around, so it is possible to execute the sound source detecting process in a further suitable condition.

In addition, in the sound source detecting system, the sound source detecting system may be mounted on a vehicle, the vehicle may include a stationary sound source detecting unit that detects a stationary sound source around the vehicle, and the noise extracting unit may extract a noise emitted from the stationary sound source detected by the stationary sound source detecting unit. In this case, the stationary sound source detecting unit detects a stationary sound source and it is possible to extract and suppress a sound, emitted from the stationary sound source, as a noise, so it is possible to execute the sound source detecting process in a further suitable condition.

A second aspect of the invention provides a sound source detecting method. The sound source detecting method detects a predetermined sound source on the basis of information about sounds collected by a plurality of sound collectors. The sound source detecting method includes: extracting a noise, emitted from a sound source other than the predetermined sound source, from signals of the sounds collected by the plurality of sound collectors; suppressing a signal component of the extracted noise from the signals of the sounds collected by the plurality of sound collectors; and detecting a location of the predetermined sound source using information about sounds having the signals of which the signal component of the noise is suppressed.

According to the aspects of the invention, it is possible to provide a sound source detecting system and sound source detecting method that are able to reduce erroneous detections and improve detection accuracy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
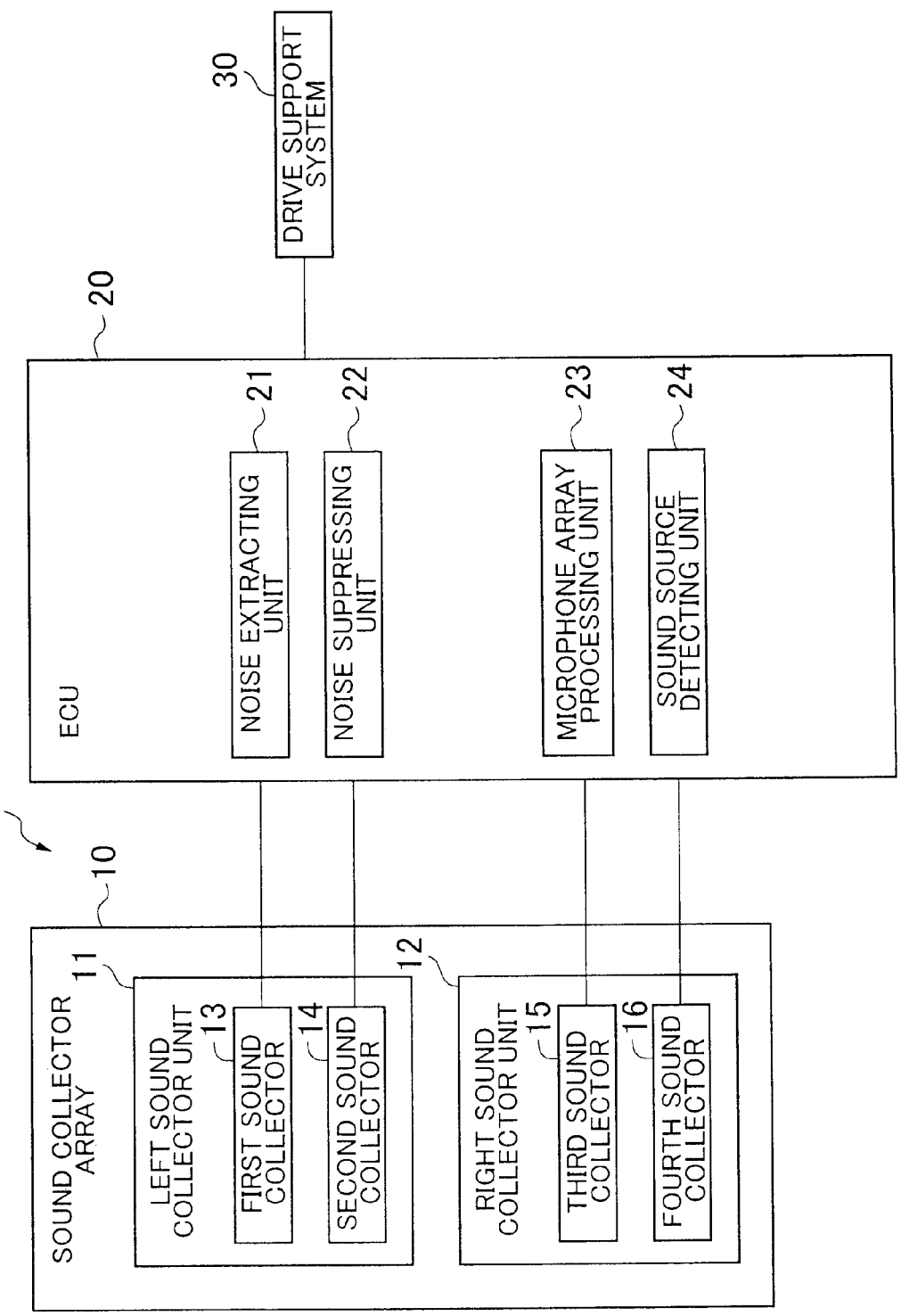
FIG. 1 is a schematic configuration diagram of a sound source detecting system according to first and second embodiments of the invention.

Hereinafter, embodiments of a sound source detecting system and sound source detecting method according to the aspects of the invention will be described with reference to the accompanying drawings. Note that, in the drawings, like reference numerals denote the same or corresponding elements in the drawings, and the overlap description is omitted.

The sound source detecting systems according to the present embodiments are mounted on a vehicle, and detect a direction in which an approaching vehicle is present. Specifically, the sound source detecting systems according to the present embodiments detect an approaching vehicle (that is, identify the moving direction of a sound source, that is, the travelling sound of a surrounding vehicle) on the basis of sounds respectively collected by a plurality of sound collectors (microphones), and then provide information about the detected approaching vehicle to a drive assist system. The present embodiments include first to fifth embodiments in which the respective components and processing modes of the sound source detecting systems are different.

Note that the travelling sound of a vehicle is mostly formed of road noise (frictional noise between a tire surface and a road surface) and pattern noise (turbulence (compression or release) of air in a tire groove). The range of the frequency component of the travelling sound of the vehicle may be measured by an experiment, or the like, in advance.

First, a sound source detecting system 1 according to the first embodiment will be described with reference to FIG. 1. FIG. 1 is a configuration diagram of the sound source detecting system according to the first embodiment.

The sound source detecting system 1 includes four sound collectors, and a sound collector unit formed of two sound collectors (a pair of sound collectors) is arranged at each of the left side and right side in the vehicle width direction. In the sound source detecting system 1, a sound source is detected by utilizing the space between the two sound collectors in each of the sound collector units. The sound source detecting system 1 includes a sound collector array 10 (a left sound collector unit 11 (a first sound collector 13 and a second sound collector 14) and a right sound collector unit 12 (a third sound collector 15 and a fourth sound collector 16)) and an electronic control unit (ECU) 20 (a noise extracting unit 21, a noise suppressing unit 22, a microphone array processing unit 23 and a sound source detecting unit 24).

The sound collector array 10 includes the left sound collector unit 11 and the right sound collector unit 12. In addition, the left sound collector unit 11 includes the first sound collector 13 and the second sound collector 14. The first sound collector 13 is arranged at the outer left side in the vehicle width direction. The second sound collector 14 is arranged adjacent to the center of the vehicle at a predetermined space from the first sound collector 13. The right sound collector unit 12 includes the third sound collector 15 and the fourth sound collector 16. The fourth sound collector 16 is arranged at the outer right side in the vehicle width direction. The third sound collector 15 is arranged adjacent to the center of the vehicle at a predetermined space from the fourth sound collector 16. In order to improve noise immunity, the space between the sound collectors in each of the sound collector units 11 and 12 is set to a narrow space.

In addition, each of the sound collectors 13, 14, 15 and 16 has the function of an acoustic-electric converter, converts a collected sound to an electric signal, and transmits the electric signal to the ECU 20. Note that each of the sound collectors 13, 14, 15 and 16 is desirably a nondirectional sound collector.

The ECU 20 is an electronic control unit formed of a central processing unit (CPU), a read only memory (ROM), a random access memory (RAM), and the like, and comprehensively controls the sound source detecting system 1. In the ECU 20, approaching vehicle detecting applications stored in the ROM are loaded onto the RAM and are executed by the CPU. As shown in FIG. 1, the ECU 20 includes the noise extracting unit 21, the noise suppressing unit 22, the microphone array processing unit 23 and the sound source detecting unit 24. These noise extracting unit 21, noise suppressing unit 22, microphone array processing unit 23 and sound source detecting unit 24 correspond to the above described applications.

The noise extracting unit 21 extracts a noise emitted from a sound source other than a predetermined sound source that is a sound source to be detected. The predetermined sound source is, for example, an approaching vehicle. That is, the noise extracting unit 21 has the function of extracting a noise emitted from a known noise source, such as an engine and fan of a host vehicle, from signals of sounds collected by the sound collector array 10, and executes noise emphasizing process over a noise from a noise source inside the host vehicle. The noise extracting process executed by the noise extracting unit 21 may be, for example, beamforming technique. In the beamforming technique, when the direction or distance of a noise source, such as an engine, is known, directivity is imparted to a sound extracting direction, and the center of the extracting direction is directed toward the noise source to actively extract a sound emitted from the noise source, thus executing the noise emphasizing process. The noise extracting unit 21 executes the noise emphasizing process in this way. By so doing, it is possible to further accurately extract a signal component of a noise to be suppressed, so it is possible to execute the sound source detecting process in a suitable condition.

The noise suppressing unit 22 has the function of suppressing a signal component of a noise extracted by the noise extracting unit 21 from signals of sounds collected by the sound collector array 10. The noise suppressing process executed by the noise suppressing unit 22 may be, for example, spectral subtraction. The spectral subtraction is to suppress a noise component as follows. The mean value of power spectra of a noise of the engine, or the like, is estimated, and the power spectra of the noise are subtracted from the power spectra of electric signals, including the noise, from the sound collector array 10. The noise suppressing unit 22 executes the above described noise suppressing process. By so doing, it is possible to obtain electric signals, of which the noise component is suppressed, from the electric signals output from the sound collector array 10.

The microphone array processing unit 23 calculates a crosscorrelation value of the electric signals of which the noise component is suppressed by the noise suppressing unit 22 for each of the pairs of sound collectors (the left sound collector unit 11 and the right sound collector unit 12). Specifically, a correlation value that indicates how much the electric signals of each pair of sound collectors are similar (waveforms are close) is calculated. Here, a crosscorrelation value between the electric signals of the first and second sound collectors 13 and 14 of the left sound collector unit 11 and a crosscorrelation value between the electric signals of the third and fourth sound collectors 15 and 16 of the right sound collector unit 12 are calculated. In addition, the microphone array processing unit 23 calculates a phase difference between two electric signals in each of the left sound collector unit 11 and the right sound collector unit 12. Furthermore, in the microphone array processing unit 23, a variance (variations) of phase difference is calculated with the use of phase differences calculated at set intervals. Note that a crosscorrelation value or a phase difference is calculated with the use of frequency information that is obtainable by crosscorrelation function or Fourier transform.

In the sound source detecting unit 24, a continuously present sound source is detected on the basis of a crosscorrelation value and a phase difference variance for each of the pairs of sound collectors. Here, it is determined whether a crosscorrelation value is larger than or equal to a threshold (for crosscorrelation determination), and it is determined whether sounds respectively collected by the pairs of sound collectors are similar sounds. The threshold (for crosscorrelation determination) is used to determine whether the waveforms of electric signals are similar to each other on the basis of a crosscorrelation value, and is preset by an experiment, or the like. In addition, it is determined whether a phase difference variance is smaller than or equal to a threshold (for phase difference variance determination), and it is determined whether sounds respectively collected by the pairs of sound collectors are continuously present at a certain location. The threshold (for phase difference variance determination) is used to determine whether a sound source is continuously present at a certain location on the basis of a phase difference variance, and is preset by an experiment, or the like. Then, when the crosscorrelation value is larger than or equal to the threshold (for crosscorrelation value determination) and the phase difference variance is smaller than or equal to the threshold (for phase difference variance determination), it is determined that a sound source is continuously present; whereas, when the condition is not satisfied, it is determined that no sound source is present.

In addition, the drive assist system 30 is a system that assists a driver in various driving operations. Particularly, the drive assist system 30 receives approaching vehicle information from the sound source detecting system 1, and carries out drive assist in association with an approaching vehicle at this time. For example, when there is an approaching vehicle toward the host vehicle, it is determined whether the approaching vehicle is likely to collide with the host vehicle, and, when it is determined that the approaching vehicle is likely to collide with the host vehicle, an alarm is issued to the driver or information about the approaching vehicle is provided to the driver, and, furthermore, vehicle control, such as automatic braking, is carried out when the likelihood of the collision increases.

Figure 2:
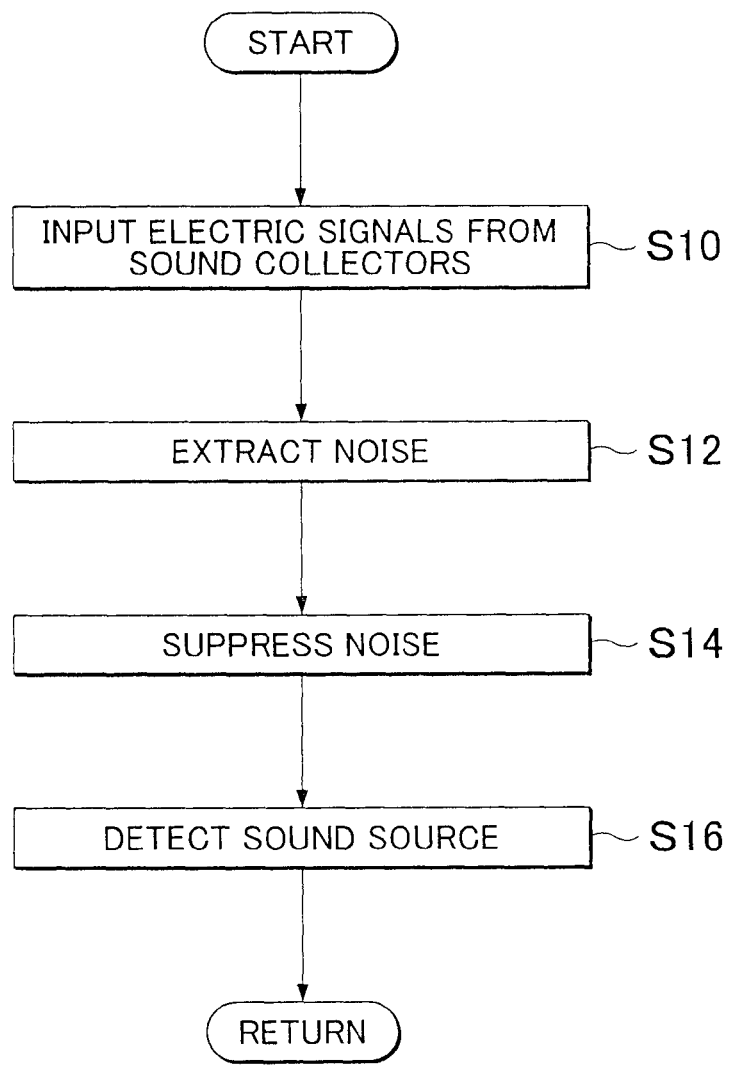
FIG. 2 is a flowchart that shows a sound source detecting process executed by the sound source detecting system according to the first embodiment.

Next, the operation of the sound source detecting system 1 will be described with reference to FIG. 2. FIG. 2 is a flowchart that shows the flow of processes executed by the ECU 20 of the sound source detecting system 1 according to the first embodiment. A series of processes shown in the flowchart of FIG. 2 are repeatedly executed by the ECU 20 at predetermined intervals. The series of processes are executed for each of the sound collector units 11 and 12. Specifically, a direction in which the predetermined sound source is present is detected by making a comparison between a sound collected by the first sound collector 13 and a sound collected by the second sound collector 14 and a comparison between a sound collected by the third sound collector 15 and a sound collected by the fourth sound collector 16. Hereinafter, the operation of detecting a sound source by making a comparison between a sound collected by the first sound collector 13 and a sound collected by the second sound collector 14 will be described. Note that, other than the series of processes of the flowchart, each of the sound collectors 13, 14, 15 and 16 collects a sound outside the vehicle, converts the collected sound to an electric signal and transmits the electric signal to the ECU 20.

The control process of the flowchart is, for example, started by turning on the ignition of the vehicle, and an electric signal is input from each of the sound collectors 13, 14, 15 and 16 to the ECU 20 in step S10 (hereinafter, referred to as "S10", and the same applies to the other steps). In addition, filtering is performed by a filter (not shown) in the ECU 20 at this time, and a component in a high-frequency band and a component in a low-frequency band are removed from the electric signals.

Then, in S12, a noise extracting process for emphasizing a noise is executed over a noise from a noise source, such as an engine, by the noise extracting unit 21. After that, in S14, the noise component in the electric signals that include the noise emphasized by the noise extracting unit 21 is suppressed by the noise suppressing unit 22.

After that, in S16, a crosscorrelation value and a phase difference variance are calculated by the microphone array processing unit 23 using the signals of which the noise component is suppressed, and it is determined by the sound source detecting unit 24 whether there is a sound source and in which direction the sound source is present on the basis of the crosscorrelation value and the phase difference variance. Then, the series of processes end.

As described above, the sound source detecting system 1 according to the first embodiment includes the noise extracting unit 21 that extracts a noise emitted from an engine, or the like, from signals of sounds collected by the sound collector array 10 and the noise suppressing unit 22 that suppresses a signal component of the noise extracted by the noise extracting unit 21 from the signals of the sounds collected by the sound collector array 10, and the microphone array processing unit 23 and the sound source detecting unit 24 detect the location of a sound source, such as an approaching vehicle, with the use of the electric signals of which the signal component of the noise is suppressed. Thus, it is possible to exclude the influence of a noise in advance, so it is possible to improve the detection accuracy of a sound source, such as an approaching vehicle, detected outside the vehicle, and it is possible to improve detection performance by reducing erroneous detections.

In addition, in the sound source detecting system 1 according to the first embodiment, a noise is extracted by the noise extracting unit 21 and then a signal component of the noise is suppressed by the noise suppressing unit 22. Therefore, noise extraction and noise suppression are alternately performed, so it is possible to suppress a processing load in comparison with the case where the noise extracting process and the noise suppressing process are simultaneously executed. Note that the sequence of the noise extracting process and the noise suppressing process is not limited to the above, the noise extracting process may be executed after the noise suppressing process.

Next, a sound source detecting system according to the second embodiment will be described with reference to FIG. 3. The second embodiment has the same configuration as the sound source detecting system 1 according to the first embodiment, but the second embodiment differs from the first embodiment in that extracting a noise by the noise extracting unit 21 and suppressing a signal component of the noise by the noise suppressing unit 22 are performed in parallel with each other.

Figure 3:
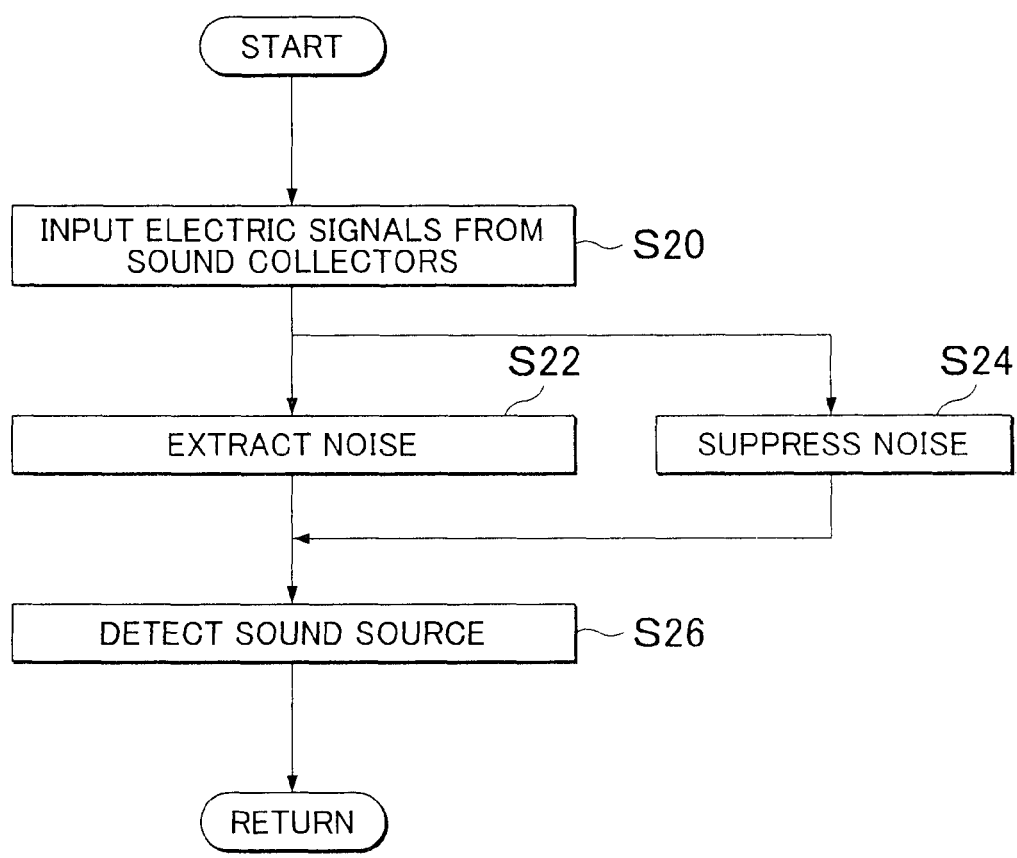
FIG. 3 is a flowchart that shows a sound source detecting process executed by the sound source detecting system according to the second embodiment.

In the second embodiment, as shown in FIG. 3, in S20, electric signals are respectively input from the sound collectors 13, 14, 15 and 16 and are subjected to filtering. After that, in S22 and S24, noise extraction by the noise extracting unit 21 and noise suppression by the noise suppressing unit 22 are performed in parallel with each other. After that, in S26, a crosscorrelation value and a phase difference variance are calculated by the microphone array processing unit 23 using the signals of which the noise component is suppressed, and it is determined by the sound source detecting unit 24 whether there is a sound source and in which direction the sound source is present on the basis of the crosscorrelation value and the phase difference variance. Then, the series of processes end. Note that the details of the individual processes of S20 to S26 in FIG. 3 are the same as the details of the individual processes of S10 to S16 in FIG. 2.

As described above, in the second embodiment, noise extraction by the noise extracting unit 21 and noise suppression by the noise suppressing unit 22 are performed in parallel with each other, so it is possible to reduce a processing time. In addition, noise extraction and noise suppression are performed simultaneously, and noise suppression is performed on electric signals immediately after the electric signals are subjected to noise extraction, so it is possible to improve the accuracy of noise suppression.

Figure 4:
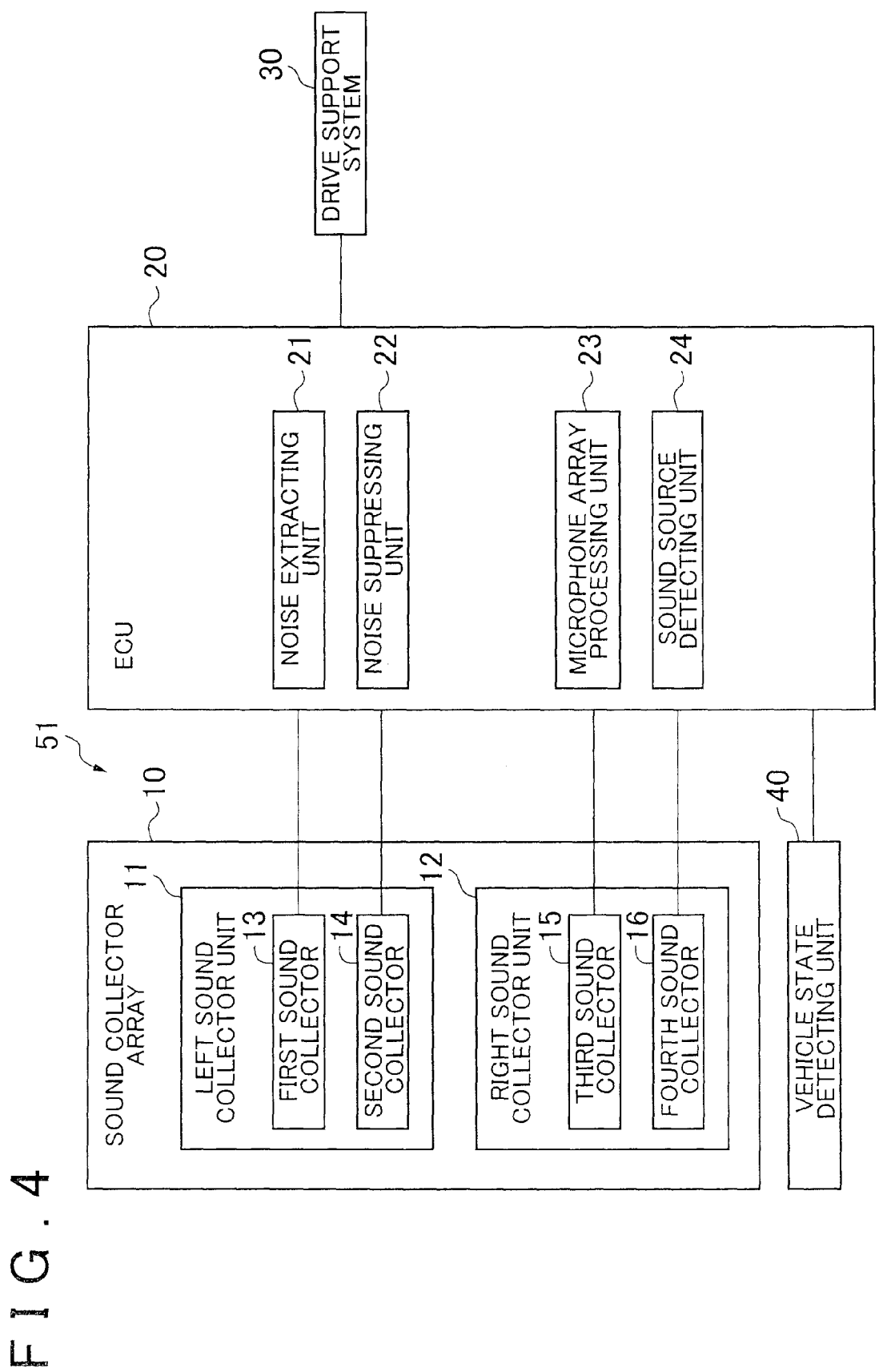
FIG. 4 is a schematic configuration diagram of a sound source detecting system according to a third embodiment of the invention.

Next, a sound source detecting system 51 according to the third embodiment will be described with reference to FIG. 4 and FIG. 5. The third embodiment has such a feature that a vehicle state detecting unit 40 that detects a vehicle state of the host vehicle is provided and noise extraction and noise suppression (hereinafter, referred to as noise processing) are performed with the use of the vehicle state of the host vehicle, detected by the vehicle state detecting unit 40.

Here, for example, a vehicle sensor or an acceleration sensor may be used as the vehicle state detecting unit 40. Hereinafter, the case where the vehicle sensor is used as the vehicle state detecting unit 40 will be described.

Figure 5:
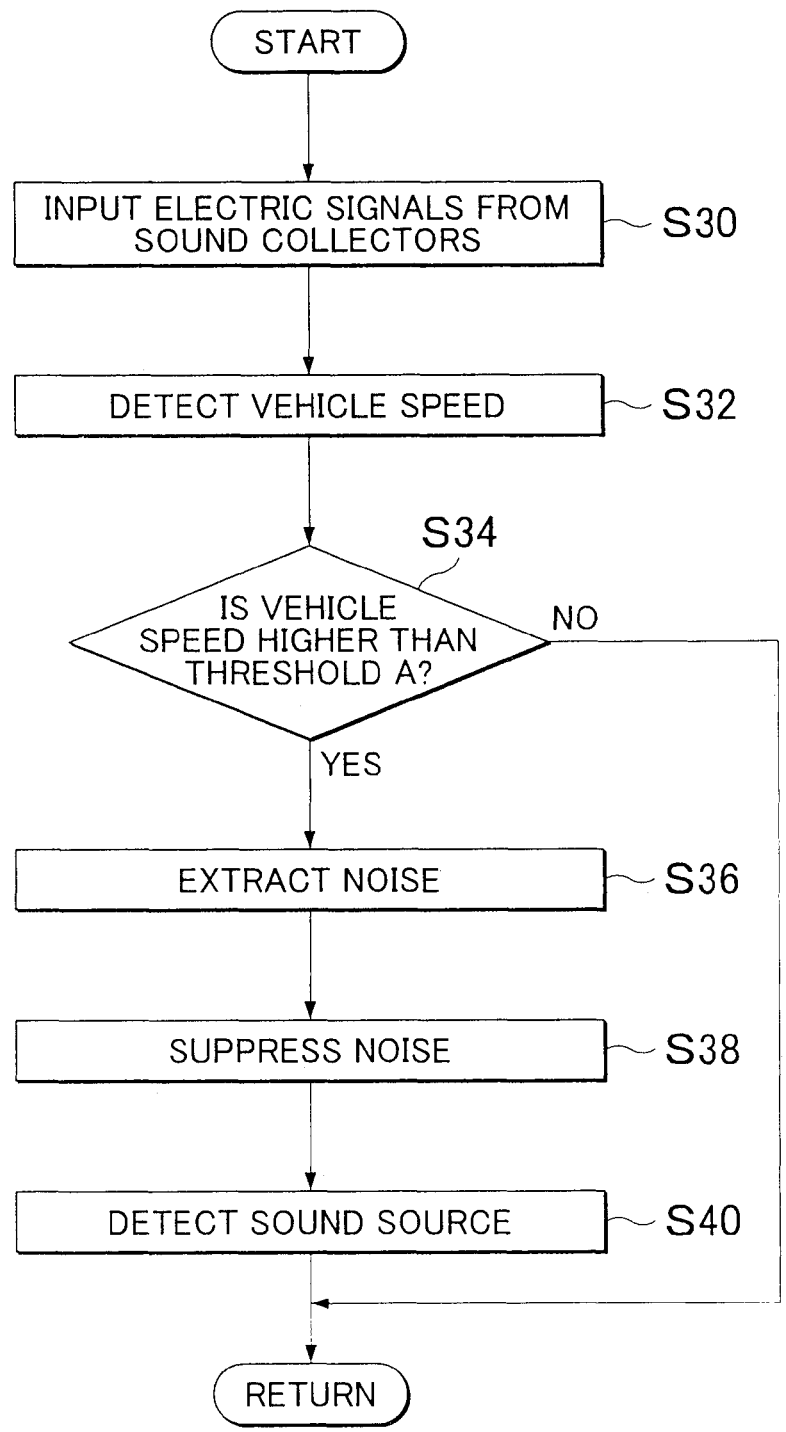
FIG. 5 is a flowchart that shows a sound source detecting process executed by the sound source detecting system according to the third embodiment.

In the third embodiment, as shown in FIG. 5, in S30, electric signals are respectively input from the sound collectors 13, 14, 15 and 16 and are subjected to filtering. After that, in S32, a vehicle speed of the host vehicle is detected by the vehicle state detecting unit 40. At this time, the detected vehicle speed is input to the ECU 20. Then, in S34, it is determined by the ECU 20 whether the input vehicle speed is higher than a predetermined threshold A, and, when the input vehicle speed is lower than or equal to the threshold A, sound source detection is not required, and the series of processes end.

On the other hand, when the vehicle speed detected by the vehicle state detecting unit 40 is higher than the threshold A in S34, the process proceeds to S36, and noise extraction by the noise extracting unit 21 is performed. At this time, for example, the noise extracting unit 21 performs noise extraction over an operating engine and tires, and an emphasizing process is performed by regarding, sounds emitted from the engine and the tires as noises.

After that, in S38, noise suppression is performed by the noise suppressing unit 22. Furthermore, in S40, a crosscorrelation value and a phase difference variance are calculated by the microphone array processing unit 23 using the signals of which the noise component is suppressed, and it is determined by the sound source detecting unit 24 whether there is a sound source and in which direction the sound source is present on the basis of the crosscorrelation value and the phase difference variance. Then, the series of processes end. Note that the processes of S30, S38 and S40 in FIG. 5 are respectively the same as the processes of S10, S14 and S16 in FIG. 2.

As described above, in the third embodiment, a vehicle state of the host vehicle is detected by the vehicle state detecting unit 40, and noise processing is performed on the basis of the detected vehicle state. Thus, noise processing is performed only when it is required in consideration of,a vehicle state of the host vehicle, so it is possible to further reduce a processing load and execute sound source detection in an optimal condition.

Note that the above description is made on an example in which the vehicle state detecting unit 40 detects a vehicle speed and noise processing is performed on the basis of whether the detected vehicle speed exceeds the threshold A; however, a detected vehicle state is not limited to a vehicle speed. For example, it is applicable that an operating state of the engine, a usage condition of an air conditioner, or the like, is detected as a vehicle state and it is determined whether noise processing is performed on the basis of the detected vehicle state. In addition, the above description is made on an example in which noise suppression is performed after noise extraction. Instead, as in the case of the second embodiment, noise extraction and noise suppression may be performed in parallel with each other.

Figure 6:
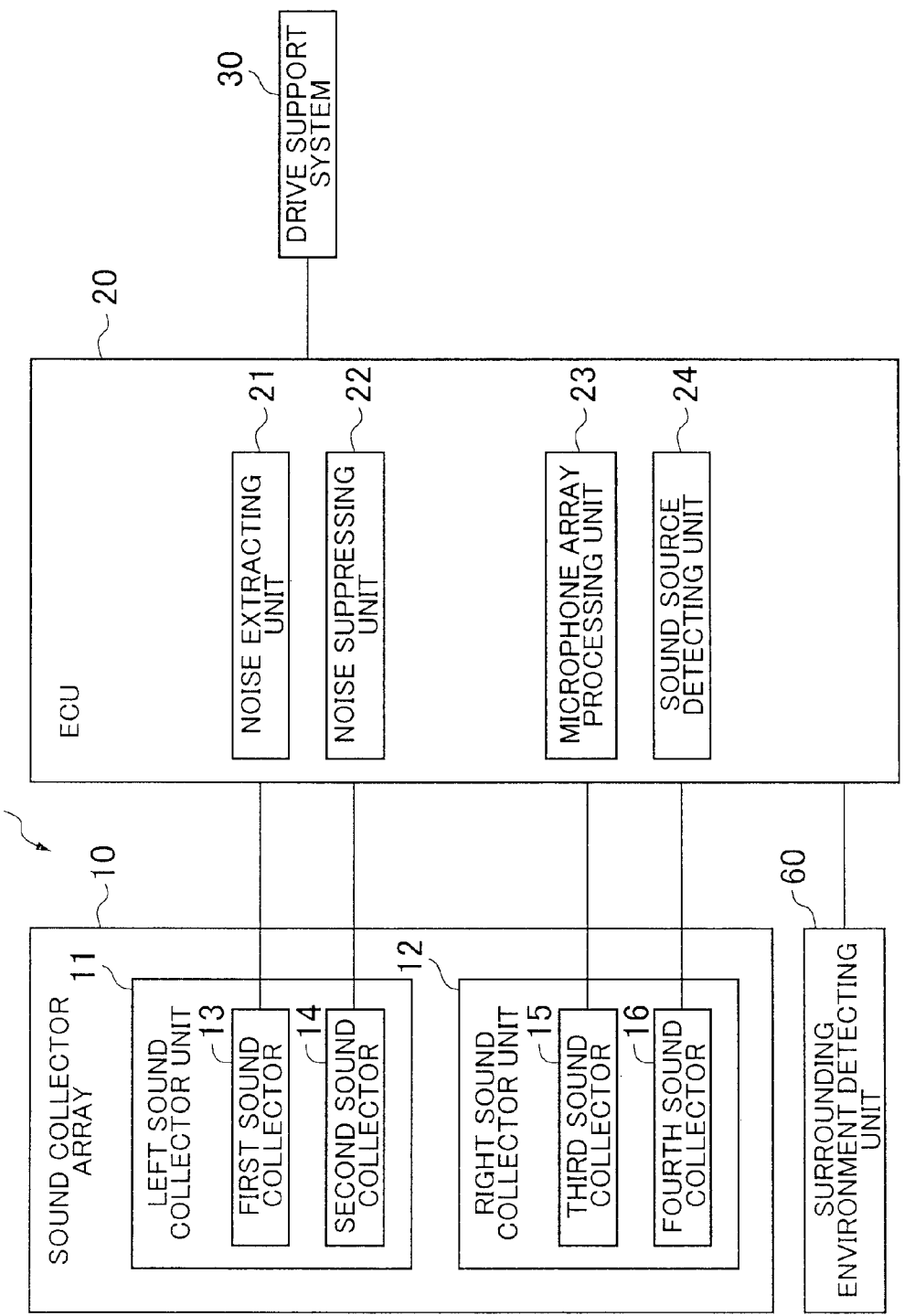
FIG. 6 is a schematic configuration diagram of a sound source detecting system according to a fourth embodiment of the invention.
Figure 7:
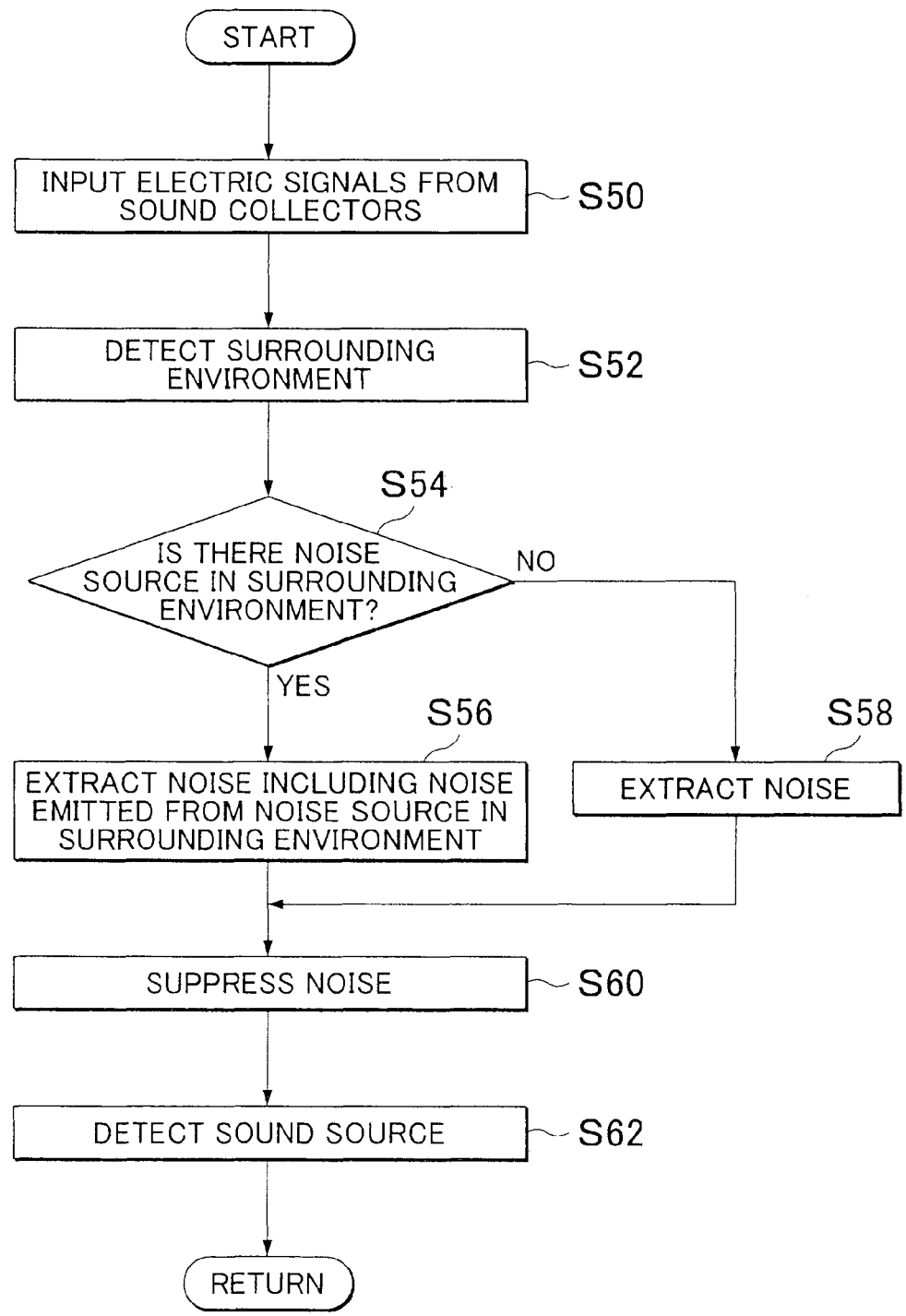
FIG. 7 is a flowchart that shows a sound source detecting process executed by the sound source detecting system according to the fourth embodiment.

Next, a sound source detecting system 71 according to the fourth embodiment will be described with reference to FIG. 6 and FIG. 7. The fourth embodiment has such a feature that a surrounding environment detecting unit 60 that detects a surrounding environment of the host vehicle is provided, it is determined whether there is a noise source, such as a construction site, on the basis of the surrounding environment detected by the surrounding environment detecting unit 60 and then noise extraction in a different mode is performed on the basis of the determined result.

Here, map information, or the like, obtained by, for example, a navigation system may be used as the surrounding environment detecting unit 60. In the fourth embodiment, as shown in FIG. 7, in S50, electric signals are respectively input from the sound collectors 13, 14, 15 and 16 and are subjected to filtering. After that, in S52, a surrounding environment is detected by the surrounding environment detecting unit 60. At this time, the detected information about the surrounding environment is input to The ECU 20. Then, in S54, it is determined by the ECU 20 whether there is a noise source, such as a construction site, in the input surrounding environment.

When it is determined in S54 that there is a noise source, the process proceeds to S56, and noise extraction is performed by the noise extracting unit 21. At this time, the noise extracting unit 21 performs noise extraction on not only a noise source of the host vehicle but also a construction site, or the like, that is the noise source in the surrounding environment, and executes the process of emphasizing noises emitted from these noise sources. On the other hand, when it is determined in S54 that there is no noise source around, noise extraction is performed on the noise source of the host vehicle as in the case of S12, or the like.

After that, in S60, noise suppression is performed by the noise suppressing unit 22. Furthermore, in S62, a crosscorrelation value and a phase difference variance are calculated by the microphone array processing unit 23 using the signals of which the noise component is suppressed, and it is determined by the sound source detecting unit 24 whether there is a sound source and in which direction the sound source is present on the basis of the crosscorrelation value and the phase difference variance. Then, the series of processes end. Note that the processes of S50, S60 and S62 in FIG. 7 are respectively the same as the processes of S10, S14 and S16 in FIG. 2.

As described above, in the fourth embodiment, a surrounding environment is detected by the surrounding environment detecting unit 60, and the noise extracting process in a different mode is executed on the basis of whether there is a noise source around. Thus, it is possible to effectively remove the influence of a noise source in a surrounding environment, and it is possible to further improve the detection accuracy of a sound source. Note that the above description is made on an example in which noise suppression is performed after noise extraction; instead, as in the case of the second embodiment, noise extraction and noise suppression may be performed in parallel with each other.

Figure 8:
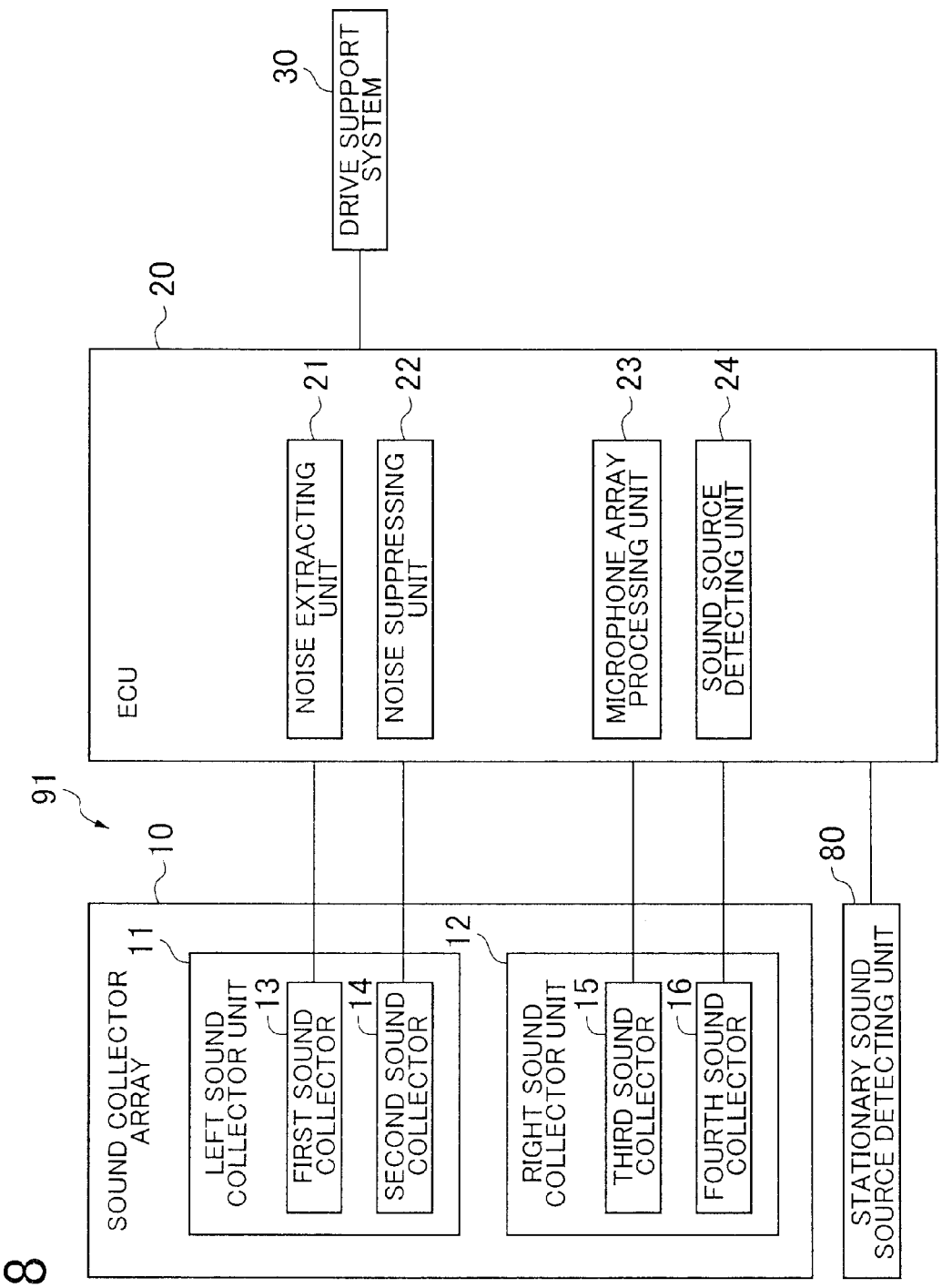
FIG. 8 is a schematic configuration diagram of a sound source detecting system according to a fifth embodiment of the invention.

Next, a sound source detecting system 91 according to the fifth embodiment will be described with reference to FIG. 8 and FIG. 9. The fifth embodiment has such a feature that a stationary sound source detecting unit 80 that detects a stationary sound source, such as a construction site, present around the host vehicle is provided and noise extraction in a different mode is performed on the basis of whether the stationary sound source detecting unit 80 has detected a stationary sound source.

Figure 9:
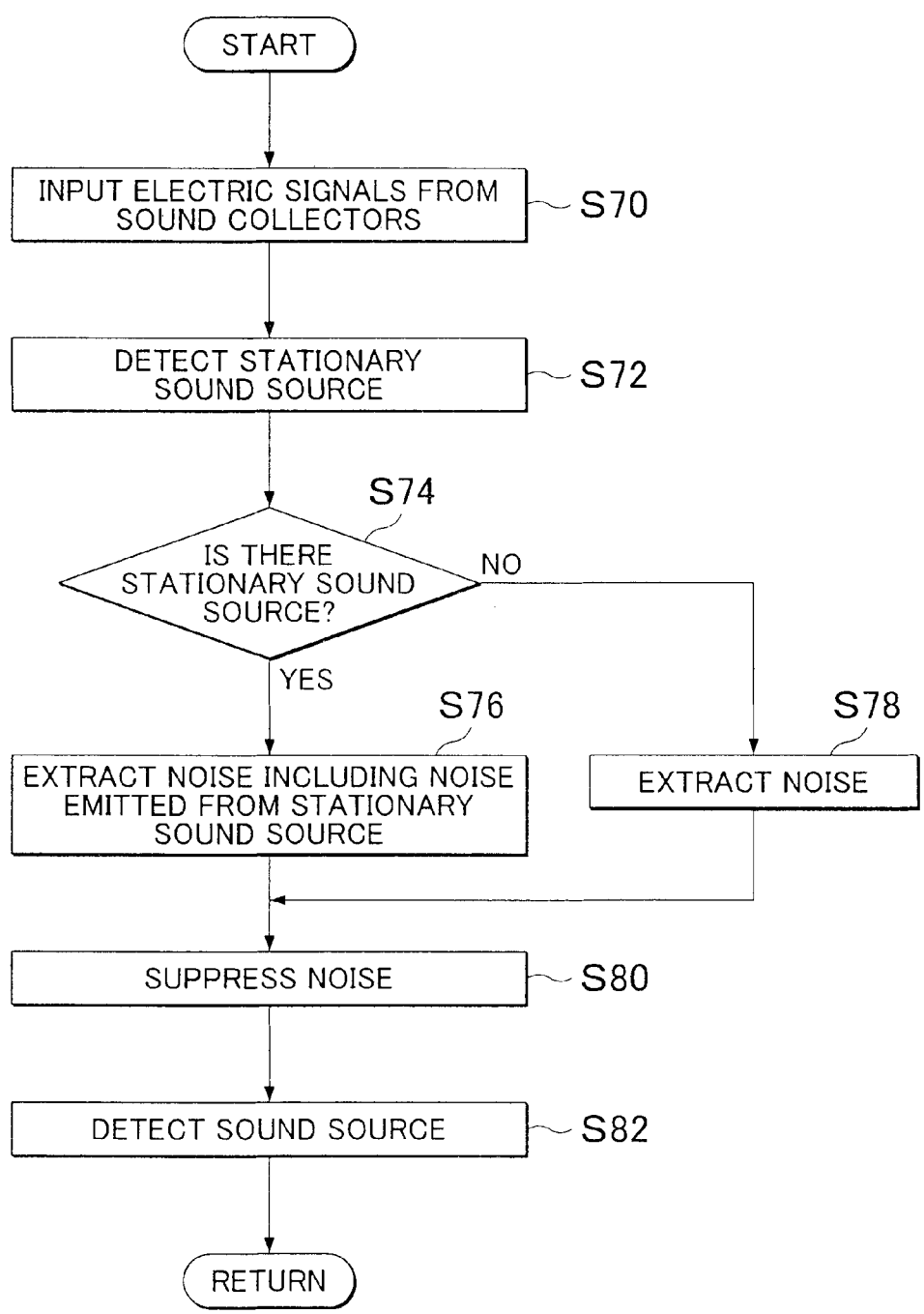
FIG. 9 is a flowchart that shows a sound source detecting process executed by the sound source detecting system according to the fifth embodiment.

In the fifth embodiment, as shown in FIG. 9, in S70, electric signals are respectively input from the sound collectors 13, 14, 15 and 16 and are subjected to filtering. After that, in S72, a stationary sound source is detected by the stationary sound source detecting unit 80. At this time, whether a stationary sound source has been detected is input to the ECU 20. Then, in S74, it is determined whether there is a stationary sound source around the host vehicle.

When it is determined by the stationary sound source detecting unit 80 in S74 that there is a stationary sound source, the process proceeds to S76, and noise extraction is performed by the noise extracting unit 21. At this time, the noise extracting unit 21 performs noise extraction on not only a noise of the host vehicle but also the detected stationary sound source, such as a construction site, and executes the process of emphasizing noises emitted from these noise sources. On the other hand, when it is determined in S74 that there is no stationary sound source around, noise extraction is performed on the noise source of the host vehicle as in the case of S12, or the like.

After that, in S80, noise suppression is performed by the noise suppressing unit 22. Furthermore, in S82, a crosscorrelation value and a phase difference variance are calculated by the microphone array processing unit 23 using the signals of which the noise component is suppressed, and it is determined by the sound source detecting unit 24 whether there is a sound source and in which direction the sound source is present on the basis of the crosscorrelation value and the phase difference variance. Then, the series of processes end. Note that the processes of S70, S80 and S82 in FIG. 9 are respectively the same as the processes of S10, S14 and S16 in FIG. 2.

As described above, in the fifth embodiment, the stationary sound source detecting unit 80 is used to detect whether there is a stationary sound source around the host vehicle and the noise extracting process in a different mode is executed on the basis of the detected result. Thus, it is also possible to exclude in advance the influence of a sound emitted from a stationary sound source that does not need to be detected for the host vehicle, so an advantageous effect that the detection accuracy of a sound source improves is obtained. In addition, advantageous effects similar to those of the above described fourth embodiment are also obtained.

Note that the above description is made on an example in which noise suppression is performed after noise extraction; instead, as in the case of the second embodiment, noise extraction and noise suppression may be performed in parallel with each other. In addition, in the fifth embodiment, the description is made on an example in which the stationary sound source detecting unit 80 detects a stationary sound source and a noise emitted from the stationary sound source is extracted. It is also applicable that, instead of the stationary sound source detecting unit 80, a non-approaching sound source detecting unit that detects a non-approaching noise source that does not approaches the host vehicle, such as a vehicle that distances from the host vehicle, is provided and, when the non-approaching sound source detecting unit has detected a non-approaching noise source, the noise extracting unit 21 executes noise extracting process over a noise from the non-approaching noise source.

The first to fifth embodiments according to the aspects of the invention are described above; however, the aspects of the invention are not limited to the first to fifth embodiments, and various modifications are possible.

For example, in the above embodiments, the aspects of the invention are applied to the sound source detecting systems 1, 51, 71 and 91 that are mounted on the vehicle and that provide detected approaching vehicle information to the drive assist system 30. Instead, the configuration of each of the sound source detecting systems 1, 51, 71 and 91 may be another configuration. For example, the aspects of the invention may be applies into a drive assist system as an approaching vehicle detecting function or a sound source detecting system may have an alarm function, or the like. In addition, the aspects of the invention may be applied to a sound source detecting system that detects a sound source other than an approaching vehicle, and, furthermore, the aspects of the invention may be applied to a sound source detecting system that is mounted on a mobile unit, other than a vehicle, such as a robot.

In addition, in the above embodiments, each of the left sound collector unit 11 and the right sound collector unit 12 includes the two sound collectors. Instead, other variations are applicable on the number of the sound collectors and the arrangement positions of the sound collectors.

The invention claimed is:

1. A sound source detecting system configured to detect a predetermined sound source on the basis of sounds collected by a plurality of sound collectors, comprising:
    a noise extracting unit configured to extract a noise, emitted from a sound source other than the predetermined sound source, from signals of the sounds collected by the plurality of sound collectors;
    a noise suppressing unit configured to suppress a signal component of the noise extracted by the noise extracting unit from the signals of the sounds collected by the plurality of sound collectors; and
    a sound source detecting unit configured to detect a location of the predetermined sound source using the sounds having the
    signals of which the signal component of the noise is suppressed by the noise suppressing unit, wherein
    the sound source detecting system is mounted on a vehicle,
    the vehicle includes a vehicle state detecting unit configured to detect a vehicle state of the vehicle, wherein the vehicle state is a vehicle speed, and
    extracting a noise by the noise extracting unit and suppressing a signal component of the noise by the noise suppressing unit are performed on the basis of the vehicle state detected by the vehicle state detecting unit.

2. The sound source detecting system according to claim 1, wherein
    the sound source detecting system is mounted on a mobile unit, and
    the noise extracting unit executes a noise emphasizing process over a noise from a noise source inside the mobile unit.

3. The sound source detecting system according to claim 1, wherein
    extracting a noise by the noise extracting unit and suppressing a signal component of the noise by the noise suppressing unit are alternately performed.

4. The sound source detecting system according to claim 1, wherein
    extracting a noise by the noise extracting unit and suppressing a signal component of the noise by the noise suppressing unit are performed in parallel with each other.

5. The sound source detecting system according to claim 1, wherein
    the vehicle includes a surrounding environment detecting unit configured to detect a surrounding environment around the vehicle, and
    when there is a noise source in the surrounding environment detected by the surrounding environment detecting unit, the noise extracting unit extracts a noise emitted from the noise source.

6. The sound source detecting system according to claim 1, wherein
    the vehicle includes a stationary sound source detecting unit configured to detect a stationary sound source around the vehicle, and
    the noise extracting unit extracts a noise emitted from the stationary sound source detected by the stationary sound source detecting unit.

7. The sound source detecting system of claim 1, wherein the predetermined sound source is an approaching object.

8. The sound source detecting system of claim 7, wherein the approaching object is an approaching vehicle.

9. A sound source detecting method that detects a predetermined sound source on the basis of sounds collected by a plurality of sound collectors, which are mounted on a vehicle including an electronic control unit, comprising:
    detecting, by the electronic control unit, a vehicle state of the vehicle, wherein the vehicle state is a vehicle speed,
    on the basis of the detected vehicle state, extracting, by the electronic control unit, a noise, emitted from a sound source other than the predetermined sound source, from signals of the sounds collected by the plurality of sound collectors;
    on the basis of the detected vehicle state, suppressing, by the electronic control unit, a signal component of the extracted noise from the signals of the sounds collected by the plurality of sound collectors; and
    detecting, by the electronic control unit, a location of the predetermined sound source using the sounds having the signals of which the signal component of the noise is suppressed.

10. The sound source detecting method of claim 9, wherein the predetermined sound source is an approaching object.

11. The sound source detecting system of claim 10, wherein the approaching object is an approaching vehicle.

* * * * *